United States Patent
Kurlander et al.

(10) Patent No.: US 7,646,755 B2
(45) Date of Patent: Jan. 12, 2010

(54) SEAMLESS INTEGRATION OF PORTABLE COMPUTING DEVICES AND DESKTOP COMPUTERS

(75) Inventors: David Joshua Kurlander, Seattle, WA (US); Xuedong David Huang, Bellevue, WA (US); Yuan Kong, Kirkland, WA (US); Silviu-Petru Cucerzan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 582 days.

(21) Appl. No.: 11/170,905

(22) Filed: Jun. 30, 2005

(65) Prior Publication Data

US 2007/0002011 A1 Jan. 4, 2007

(51) Int. Cl.
*H04W 4/00* (2009.01)
(52) U.S. Cl. .................... 370/338; 370/328; 455/556.1; 455/557; 455/411; 455/421
(58) Field of Classification Search ............... 370/338, 370/328; 455/556.1, 557, 411, 421
See application file for complete search history.

(56) References Cited

U.S. PATENT DOCUMENTS

| | | | |
|---|---|---|---|
| 5,493,692 A | 2/1996 | Theimer et al. | |
| 5,544,321 A | 8/1996 | Theimer et al. | |
| 5,555,376 A | 9/1996 | Theimer et al. | |
| 5,603,054 A | 2/1997 | Theimer et al. | |
| 5,611,050 A | 3/1997 | Theimer et al. | |
| 5,793,329 A * | 8/1998 | Nakada et al. | 342/357.07 |
| 5,812,865 A | 9/1998 | Theimer et al. | |
| 5,898,902 A * | 4/1999 | Tuzov | 455/13.1 |
| 6,466,232 B1 | 10/2002 | Newell et al. | |
| 6,513,046 B1 | 1/2003 | Abbott, III et al. | |
| 6,549,915 B2 | 4/2003 | Abbott, III et al. | |
| 6,747,675 B1 | 6/2004 | Abbott et al. | |
| 6,791,580 B1 | 9/2004 | Abbott et al. | |
| 6,801,223 B1 | 10/2004 | Abbott et al. | |
| 6,812,937 B1 | 11/2004 | Abbott et al. | |

(Continued)

FOREIGN PATENT DOCUMENTS

WO 9800787 1/1998

(Continued)

OTHER PUBLICATIONS

Andy Harter, et al., A Distributed Location System for the Active Office, IEEE Network, 1994, pp. 62-70.

(Continued)

*Primary Examiner*—Nghi H Ly
(74) *Attorney, Agent, or Firm*—Lee & Hayes, PLLC

(57) ABSTRACT

Portable computing devices automatically interface with other computing devices to interact in a collaborative effort toward providing a single, seamless computing experience for a user. As a user walks into a room with a cellular telephone certain functionality and data can be automatically unloaded to a desktop computer or other device based on a user or device identification or state. For example, a conversation on a cellular telephone can be automatically migrated to a desktop telephone as a user sits down. As a user is about to leave a room for a meeting, the desktop computer can update the telephone with latest versions of certain files. Thus, devices can automatically aggregate and/or decouple to provide a user with a single computing experience. These portable devices can broadcast an extensible set of services to other devices as well as to a host computer or server.

14 Claims, 14 Drawing Sheets

U.S. PATENT DOCUMENTS

| | | | |
|---|---|---|---|
| 6,842,877 | B2 | 1/2005 | Robarts et al. |
| 2001/0040590 | A1 | 11/2001 | Abbott et al. |
| 2001/0040591 | A1 | 11/2001 | Abbott et al. |
| 2001/0043231 | A1 | 11/2001 | Abbott et al. |
| 2001/0043232 | A1 | 11/2001 | Abbott et al. |
| 2002/0032689 | A1 | 3/2002 | Abbott, III et al. |
| 2002/0044152 | A1 | 4/2002 | Abbott, III et al. |
| 2002/0052930 | A1 | 5/2002 | Abbott et al. |
| 2002/0052963 | A1 | 5/2002 | Abbott et al. |
| 2002/0054130 | A1 | 5/2002 | Abbott, III et al. |
| 2002/0054174 | A1 | 5/2002 | Abbott et al. |
| 2002/0078204 | A1 | 6/2002 | Newell et al. |
| 2002/0080155 | A1 | 6/2002 | Abbott et al. |
| 2002/0080156 | A1 | 6/2002 | Abbott et al. |
| 2002/0083025 | A1 | 6/2002 | Robarts et al. |
| 2002/0083158 | A1 | 6/2002 | Abbott et al. |
| 2002/0087525 | A1 | 7/2002 | Abbott et al. |
| 2002/0099817 | A1 | 7/2002 | Abbott et al. |
| 2003/0046401 | A1 | 3/2003 | Abbott et al. |
| 2003/0154476 | A1 | 8/2003 | Abbott, III et al. |
| 2004/0063459 | A1* | 4/2004 | Yamashita et al. ....... 455/556.1 |
| 2004/0259539 | A1* | 12/2004 | Ayatsuka ................. 455/422.1 |
| 2005/0034078 | A1 | 2/2005 | Abbott et al. |
| 2006/0128388 | A1* | 6/2006 | Mason et al. ............... 455/445 |

OTHER PUBLICATIONS

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38-No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Remembrance Agent: A continuously running automated information retrieval system, The Proceedings of The First International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Remembrance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, The Wearable Remembrance Agent: A System for Augmented Memory, Personal Technologies Journal Special Issue on Wearable Computing, 1997, 12 pages.

Mark Billinghurst, Research Directions in Wearable Computing, University of Washington, May 1998, 48 pages.

Mark Weiser, The Computer for the 21st Century, Scientific American, Sep. 1991, 8 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

* cited by examiner

SEAMLESS INTEGRATION OF PORTABLE COMPUTING DEVICES AND DESKTOP COMPUTERS

BACKGROUND

Both enterprises and individuals are increasingly interested in using handheld devices. Most modern handheld devices are equipped with multiple sensors (e.g., microphone, wireless transmitter, global positioning system (GPS) engine, camera, stylus, etc.). However, there are no applications available that make full use of multiple sensors. In other words, multi-sensory technologies that make handheld devices a multi-modal multi-lingual mobile assistant are not available.

Today, portable devices such as cellular telephones and personal data assistants (PDAs) employ state-of-the-art operating systems. As such, these devices have increased computing power in hardware and increased features in software in relation to earlier technologies. Oftentimes, cellular telephones are equipped with built-in digital image capture devices (e.g., cameras) and microphones together with computing functionalities of personal digital assistants (PDAs). Since these devices combine the functionality of cellular telephones with the functionality of PDAs, they are commonly referred to as "smartphones." The hardware and software features available in these smartphones and similar technologically capable devices provide developers the capability and flexibility to build applications through a versatile platform. The increasing market penetration of these portable devices (e.g., PDAs) inspires programmers to build applications, games, etc. for these smartphones.

As described above, many smartphones have built-in digital image capture devices (e.g., cameras) capable of generating video graphics array (VGA) quality pictures having 640× 480 pixel resolution. Several higher-end smartphones, especially those developed in the European and Asian markets, are capable of taking pictures of 1 Mega-pixel resolution and higher. As well, many of these image capture devices that are integrated into portable devices are capable of capturing motion pictures. With the technological advances in handheld and portable devices, there is an ongoing and increasing need to maximize the benefit of these continually emerging technologies.

However, today, these portable devices (e.g., smartphones, PDAs) do not integrate well with a desktop computer. For example, although smartphones and PDAs are frequently equipped with image capture devices, this functionality is not currently integrated into a computer or disparate device thereby enabling a collaborated and/or aggregated use of this functionality.

Electronic organizers are widely used to manage and organize a variety of PIM (personal information manager) data. An electronic organizer (e.g., PIM) enables a user to electronically retain personal data for any purpose and to retrieve the data as desired. Today, PIMs can vary widely, but common to all of them is to provide methods for managing and organizing personal information and to make the information readily available to the user.

Today, PIMs have become increasingly more common. For instance, personal data assistants (PDAs) are probably the most common example of a PIM. Additionally, emerging mobile devices such as mobile telephones, smartphones, and handheld pocket computers frequently incorporate PIM functionality. Oftentimes, a user has multiple devices for which synchronization of data (e.g., PIM data, files) is desired. By way of example, it is not uncommon for a user to have a PDA, a mobile telephone, a home personal computer (PC) and an office PC whereby synchronization of data is desired.

Systems do not currently exist that provide for automatic collaboration, synchronization and/or aggregation of data and services between multiple devices. Furthermore, conventional systems and devices do not leverage the increased computing power of portable devices and PCs by automatically facilitating data and service synchronization and/or collaboration. In other words, devices that enable wireless synchronization and collaboration of data and services between disparate devices are not currently available.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises an integration component that can facilitate coupling and/or decoupling a portable communication device to a host computer system. Additionally, the invention can facilitate detection of a portable device with respect to a communication range of the host computer system. Further, the invention can facilitate collaborating access and utilization of a service between the handheld communication device and the host computer system.

Another aspect employs a portable computing device that can automatically interface with other computing devices to interact in a collaborative effort toward providing a single, seamless computing experience for a user. For example, as a user walks into a room with a device (e.g., cellular telephone), the device can unload certain functionality and/or data to a desktop computer or other device based on a user and/or device identification and/or state. By way of example, the invention can employ a more powerful device such as a desktop computer to process data and return the data to the portable device. In one aspect, the desktop computer could communicate the processing services to the portable device and the portable device can choose to use any subset of the available services. It is to be appreciated that this selection can be effected manually or automatically (e.g., via rule-based logic and/or artificial intelligence (AI) reasoning techniques).

In one particular aspect, a portable device (e.g., cellular telephone) can facilitate saving a photo in a raw format or with some sub-optimal characteristics. Upon detecting that a desktop computer is equipped with a photo enhancer, the portable device can send the photo data to the desktop computer. Thereafter, the desktop computer can facilitate automatically adjusting contrast and other parameters. Once modified, the photo can be transmitted back to the portable device. It will be appreciated that the transmission/modification process could be transparent to the user. By way of further example, an on-going conversation on the cellular telephone can be automatically migrated to a desktop telephone as a user sits down.

In yet another aspect, as a user is about to leave a room for a meeting, the desktop computer can update a smartphone or personal data assistant (PDA) with latest versions of certain inferred and/or pre-selected files. Moreover, devices can automatically aggregate and/or decouple to provide a user with a single computing experience. A portable device can also be used to remotely control a computer. These portable devices can broadcast an extensible set of services to other devices as well as to a host computer or server.

In another aspect, the system can facilitate integration of an interface component into a handheld or portable device. An authentication component can be employed to verify a permission or set of permissions with respect to the portable device and/or a user of the portable device. Aspects can employ handshake protocols or the like to facilitate authentication.

Yet other aspects employ a security component that can protect data transmission from unauthorized access. For example, a hash function component can be employed to encrypt data prior to transmission. Cryptographic public/private key pairs can be employed to effect encryption of the data.

Still other aspects can facilitate coupling multiple devices whereas multiple services can be collaborated between the coupled devices. As well, multiple devices can be coupled whereas data can be synchronized between the devices upon establishment of a coupled connection. Moreover, data and/or services can be synchronized in anticipation of a decoupled state.

In yet another aspect thereof, an artificial intelligence (AI) component is provided that employs a probabilistic and/or statistical-based analysis to prognose or infer an action that a user desires to be automatically performed. Additionally, a rules-based logic can be employed together with or separate from the AI component to effect automating one or more actions.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
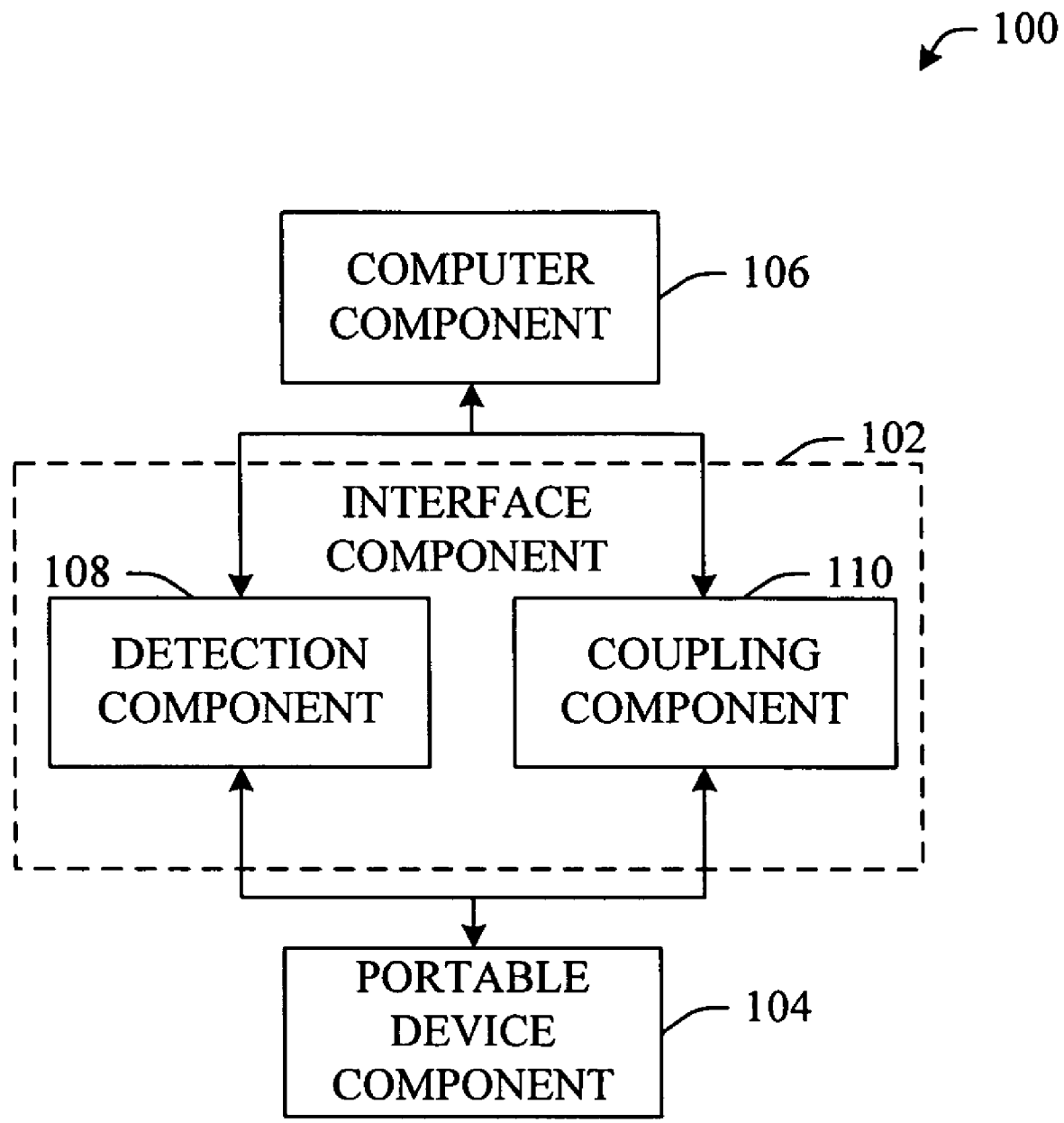
FIG. 1 illustrates a system that facilitates detecting and coupling a portable device to a computer component in accordance with an aspect of the invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates automatically integrating devices. Generally, system 100 can include an interface component 102 that can facilitate automatic and seamless integration of a portable device component 104 with a disparate computer component 106. By way of example, portable device component 104 can be a cellular telephone, smartphone, personal data assistant (PDA), pocket computer, laptop computer or the like. Although a single portable device component 104 is illustrated, it will be understood that the novel functionality of the subject invention can be employed to integrate any number of disparate devices thereby establishing a unified and seamless computing experience.

Computer component 106 can be any type of disparate device. For example, in one aspect, computer component 106 can be a desktop personal computer (PC). In other aspects, computer component 106 can be a laptop computer, a server, a disparate cellular telephone, smartphone, PDA, pocket computer or the like.

With continued reference to FIG. 1, interface component 102 can include a detection component 108 and a coupling component 110. Detection component 108 can facilitate identifying when and/if a compatible portable device (e.g., 104) enters or exits a wireless range of a host component (e.g., computer component 106). For example, in a Wi-Fi scenario, detection component 108 can facilitate monitoring (e.g., sensing) for compatible Wi-Fi-equipped (e.g., IEEE 802.11g equipped) devices. It is to be appreciated that any wireless communication protocol can be employed in connection with the subject invention. By way of further example, but not limitation, the invention can employ a disparate IEEE 802.11 Wi-Fi protocol (e.g., 802.11b), Bluetooth™, infrared protocol or the like without departing from the spirit and/or scope of this disclosure and claims appended hereto.

Once detected, the coupling component 110 can facilitate collaborating data and/or services between the connected devices (e.g., portable device 104 and computer component 106). Effectively, a private network can be established between the portable device 104 and the computer component 106 whereby, data and services can be accessible between the devices as if the devices were completely integrated. In other words, once detected by the detection component 108, the portable device 104 can be seamlessly integrated into the computer component 106 thus effecting a unified computing experience. Once coupled by the coupling device 110, the portable device 104 can automatically interact with other computing devices (e.g., computer component 106) in a collaborative manner thereby providing a single, seamless computing experience for a user.

By way of example, the invention can employ a more powerful device such a desktop computer to process data and return the data to the portable device. In one aspect, the desktop computer could communicate the processing services to the portable device and the portable device can choose to use any subset of the available services. It is to be appreciated that this selection can be effected manually or automatically (e.g., via rule-based logic and/or artificial intelligence (AI) reasoning techniques).

In one particular aspect, a portable device (e.g., cellular telephone) can facilitate saving a photo in a raw format or with some sub-optimal characteristics. Upon detecting that a desktop computer is equipped with a photo enhancer, the portable device can send the photo data to the desktop computer. Thereafter, the desktop computer can facilitate automatically adjusting contrast and other parameters. Once modified, the photo can be transmitted back to the portable device. It will be appreciated that the transmission/modification process could be transparent to the user.

Other aspects could include accessing, downloading, and/or updating weather information, getting full web search results for previous searches made over the phone, etc. It will be appreciated that the seamless integration scenarios are countless. As well, it is to be understood and appreciated that these additional scenarios are to be included in the scope of this disclosure and claims appended hereto.

The aforementioned single, seamless computing experience will be better understood upon a review of the scenarios that follow. The following scenarios are provided merely to add context to the novel functionality of the invention. It is to be understood that these scenarios are not intended to limit the scope of the invention and/or claims appended hereto in any way. Other specific scenarios exist that can be identified by those skilled in the art. These additional scenarios are intended to be included in the scope of the subject invention.

A first scenario is directed toward an aspect whereby the portable device 104 is a Wi-Fi equipped cellular telephone. In accordance with this aspect, a user can walk into a room having a Wi-Fi equipped computer component 106. Once detected by the detection component 108, the coupling component 110 can effect unloading certain functionality to the computer component 106 (e.g., desktop computer) based upon a state of the portable device component 104. For instance, suppose the portable device component 104 (e.g., cellular telephone) is in a connected state. By way of example, suppose a user is engaged in a conversation through portable device component 104. In accordance with the invention, the coupling component 110 can effect automatic migration the conversation to the desktop computer (e.g., computer component 106). This service collaboration (e.g., migration) can enable a user to employ a portable device component 104 service via the computer component 106.

In another scenario, the portable device 104 is a Bluetooth™ equipped cellular telephone having an image capture device integrated therein. In accordance with this aspect, upon entering a proximate location of a Bluetooth™ enabled computer component 106, the detection component 108 can identify the portable device 104. Once identified, the coupling component 110 can facilitate collaboration of the image capture device functionality from the portable device component 104 with the computer component 106. Thus, the functionality of the image capture device can be utilized and controlled from the computer component 106.

Although these scenarios are directed to collaborating a service from a portable device 104 to a computer component 106, it is to be appreciated that services and/or data can be collaborated, shared and/or aggregated from a computer component 106 to a portable device component 104 in accordance with alternative aspects. In these alternative aspects, functionality of the computer component 106 can be controlled remotely via the portable device component 104. These alternative aspects will be better understood upon a discussion of the figures that follow.

Figure 2:
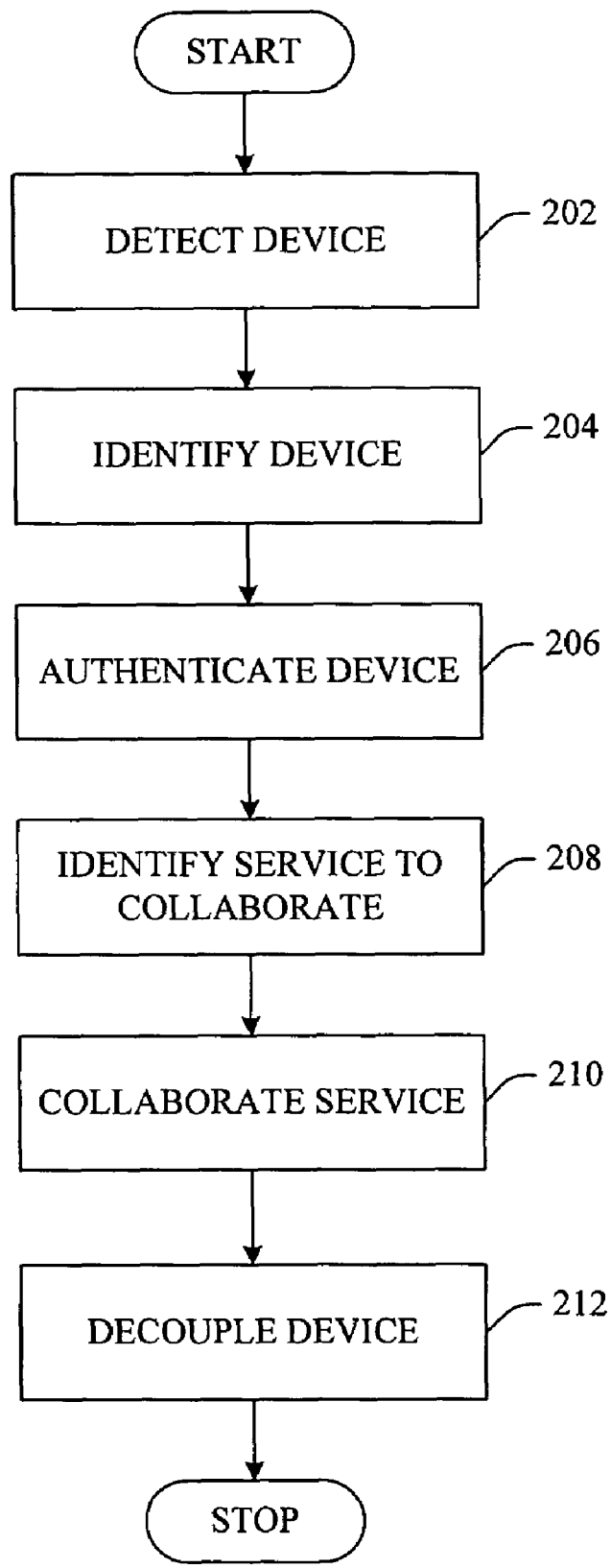
FIG. 2 illustrates an exemplary flow chart of procedures that facilitate collaboration of services in accordance with an aspect of the invention.

FIG. 2 illustrates a methodology of coupling and collaborating a service between computing devices in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 202 a device is detected. As described supra, the device can be detected upon entering a wireless communication range of a disparate device. For example, the device can be detected upon entering a Wi-Fi range of a disparate device or router. More specifically, a 2.4 GHz wireless 802.11g router can be employed whereby the device can be detected upon entering the transmission range of the router.

Once detected, the device can be identified at 204. In other words, the device type can be identified thus prompting configuration of a disparate device to initiate collaboration of a service(s). The device type can be, but is not limited to be, a cellular telephone, smartphone, PDA, or the like.

Authentication of the identified device can occur at 206. It will be appreciated that any method of authentication can be employed at 206. In one example, a simple password can be employed to verify identity of a device and/or user. In another example, a handshake protocol can be employed to effect authentication. In still other aspects, biometrics or the like can be employed to effect authentication.

At 208, a collaboration service can be identified. Referring again to the example above, the service of transmitting voice signals (e.g., telephone calls) can be collaborated between the authenticated device and the connected device at 210. Finally, at 212, the devices can be decoupled. In one instance, the devices can be decoupled as the detected device exits the communication range. In this instance, the service (e.g., voice communication) can be transferred back to the portable device. In another instance, decoupling can occur upon termination of the telephone call.

Figure 3:
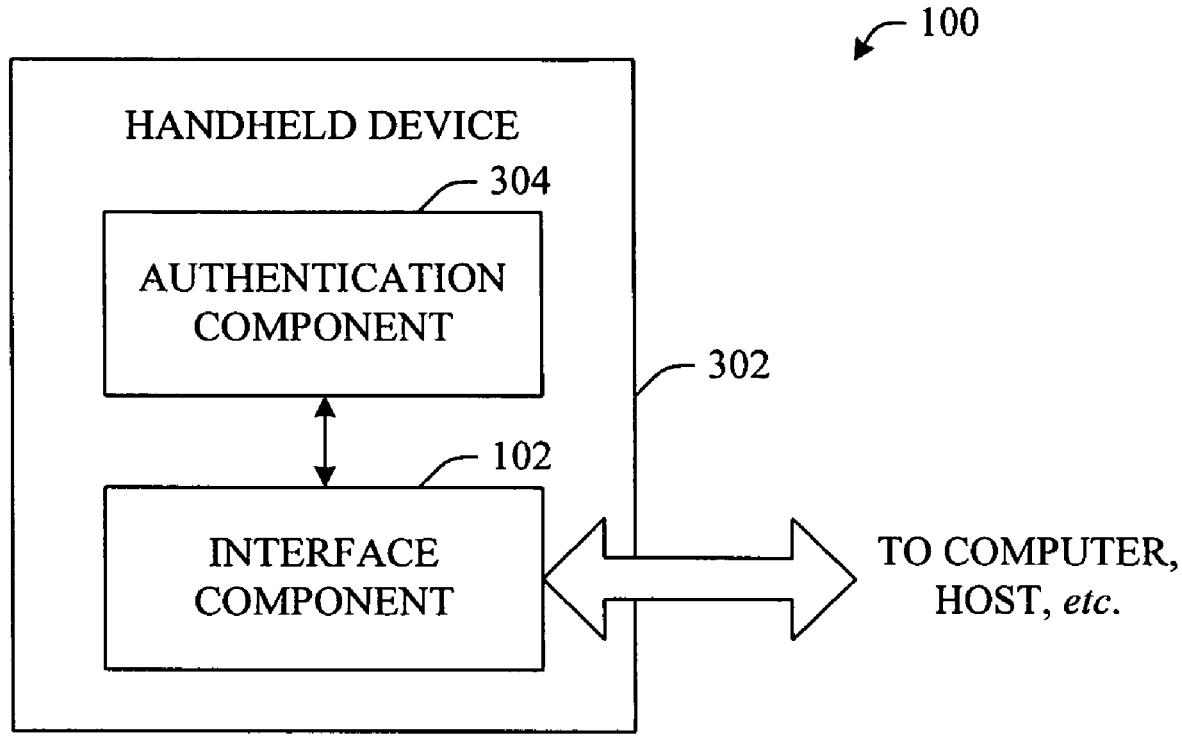
FIG. 3 illustrates a block diagram of a handheld device having an interface component and an authentication component in accordance with an aspect of the invention.

FIG. 3 illustrates an exemplary system 300 whereby handheld device 302 can include interface component 102 and an authentication component 304. It should be understood that although FIG. 3 illustrates interface component 102 integral to handheld device 302, interface component 102 can be employed external to handheld device as illustrated in FIG. 1. By way of example, interface component 102 can be integral to the computing device (e.g., host) which can collaborate with the handheld device 302 to share a service(s) and/or data.

The authentication component 304 can work together with the interface component 102 to effect a valid communication between the handheld device 302 and a host. For example, a handshaking protocol can be employed whereby signals are transmitted back and forth between the handheld device 302 and the host over a wireless communications link (e.g., Wi-Fi) to establish a valid connection between the devices. Essentially, through the handshaking protocol, the authentication component 304 can verify the identity of a device and/or user that is connecting to the host. As well, the authentication component 304 can be employed to verify the integrity of a broadcasted service or set of extensible services.

Figure 4:
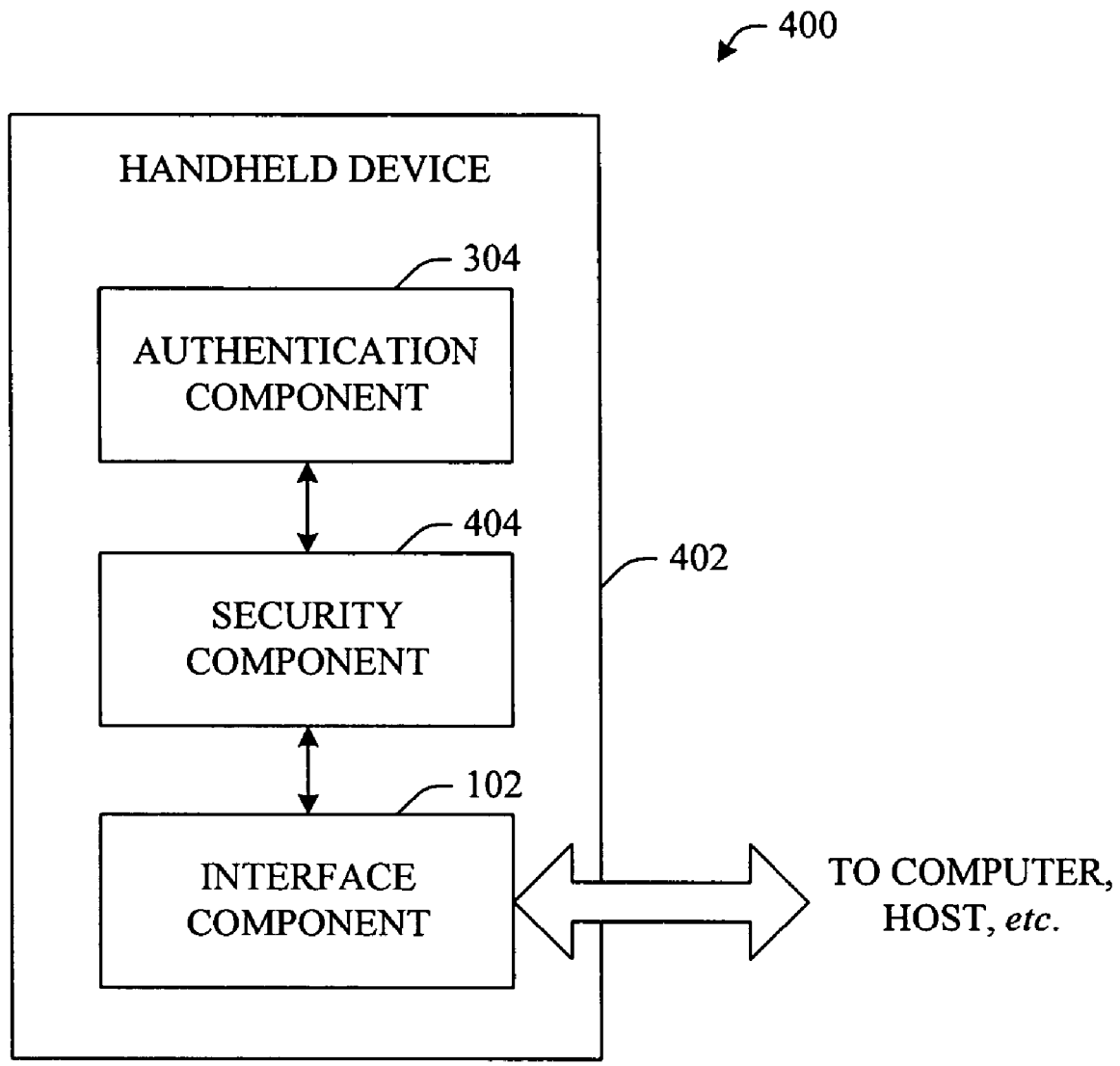
FIG. 4 illustrates a handheld device that employs a security component to secure collaboration of services and data in accordance with an aspect of the invention.

Referring now to FIG. 4, there is illustrated a system 400 that facilitates secure collaboration of a service in accordance with the invention. Generally, system 400 can include a handheld device 402 capable of collaborating a service and/or data with a host or other computing device. As described supra, collaboration can be automatically effected upon entering a communication range of the host or other computing device. As well, it will be appreciated that artificial intelligence (AI) reasoning and/or rules-based logic can be employed to effect initiation of service and/or data collaboration. These alternative aspects will be described in greater detail with reference to FIGS. 10 and 11 infra.

In the aspect of FIG. 4, handheld device 402 can include an interface component 102, an authentication component 304 and a security component 404. The security component 404 can be employed to effect secure communications between the handheld device 402 and the host or other computing device. In one aspect, the security component 404 can employ state-of-the-art cryptographic techniques in order to protect broadcast services and/or data.

By way of example, a public key cryptographic method can be employed whereas a two-part key (e.g., code) can be used to secure communications. This two-part key can include public and private components thus ensuring secure transmissions. In accordance with a public keying cryptographic method, in order to encrypt messages, the published key(s) of the recipient is used when encrypting the message. To decrypt the received transmission, the recipient would use an unpublished (e.g., secure, private) key. It will be appreciated that this cryptographic method can secure transmission of broadcast services and/or data. It is also to be appreciated that two-part keying methods (e.g., Rivest-Shamir-Adelman (RSA)-brand cryptography) can also be used as a digital signature for authentication via the authentication component 304.

Figure 5:
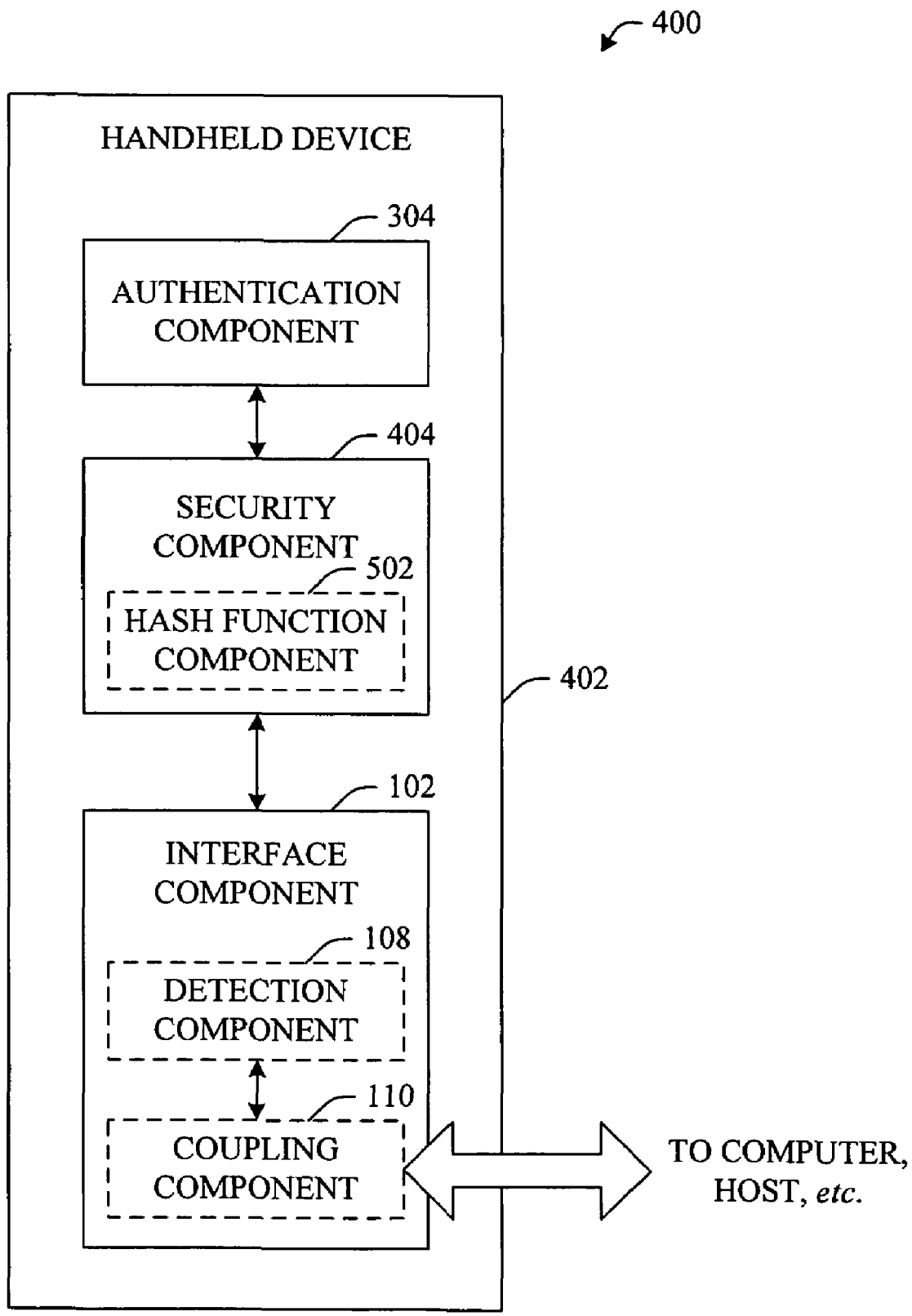
FIG. 5 illustrates a handheld device that includes a hash function component that facilitates encryption of communicated data and services in accordance with an aspect of the invention.

FIG. 5 illustrates a yet another block diagram architecture of exemplary system 400 that facilitates authenticated and secured transmission between handheld device 402 and a host or other computing system in accordance with the invention. As previously described with reference to FIG. 4, handheld device 402 can include an interface component 102, an authentication component 304 and a security component 404. These components can have the same or similar functionality as described supra.

Additionally, FIG. 5 illustrates that security component 404 can include a hash function component 502. This hash function component 502 can be employed to effect secure communications through the use of a digital signature that protects the transmitted and/or broadcast service(s). For example, a one-way hash function can be used to create a digital signature for message authentication.

Figure 6:
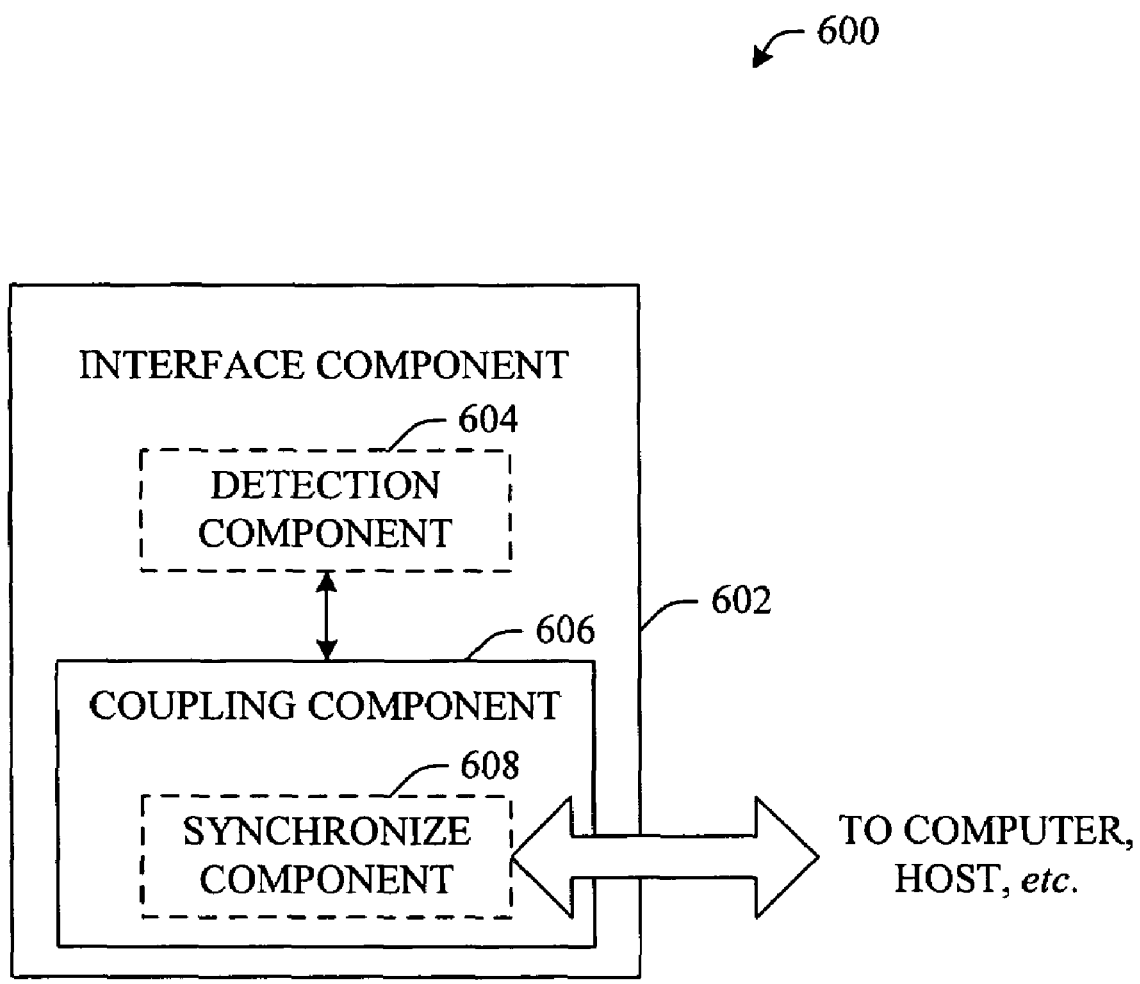
FIG. 6 illustrates an interface component that facilitates a synchronize component in accordance with an aspect of the invention.

Referring now to FIG. 6, there is illustrated a system 600 that facilitates synchronization of data and/or services in accordance with the invention. Generally, system 600 can include an interface component 602 that can automatically send and/or receive data from a host or other computing device. More particularly, interface component 602 can include a detection component 604 and a coupling component 606.

As described above, a detection component 604 can be employed to determine when/if a portable device enters and/or exits a communication range of a host or other computing device. It will be appreciated that any suitable mechanism including, but not limited to, location positioning systems can be used to determine when/if a portable device enters the wireless communication range. As well, a location positioning system such as a global positioning system (GPS) can be employed to determine when a portable device exits, or is about to exit, the communication range.

The coupling component 606 of FIG. 6 can be employed to effect communication between the portable device and a host or other computing device. As illustrated, coupling component 606 can include a synchronize component 608 that can enable a service(s) and/or data to be synchronized between the devices.

By way of illustration but not limitation, suppose a user with a PDA enters a communication range of a desktop computer. The synchronize component 608 can effect automatic synchronization of a service(s) and/or data file(s) once detection and coupling occurs. Similarly, prior to exiting the communication range, the system can anticipate the exit whereas the synchronize component 608 can effect automatically updating the PDA with the latest versions of certain files from the desktop computer. It will be appreciated that this process of updating can be initiated upon a determination made by the detection component 604 that the user (or device) is about to leave the communication range. This determination can be made in any manner including, but not limited to, GPS, accelerometer, signal strength analysis, etc.

Figure 7:
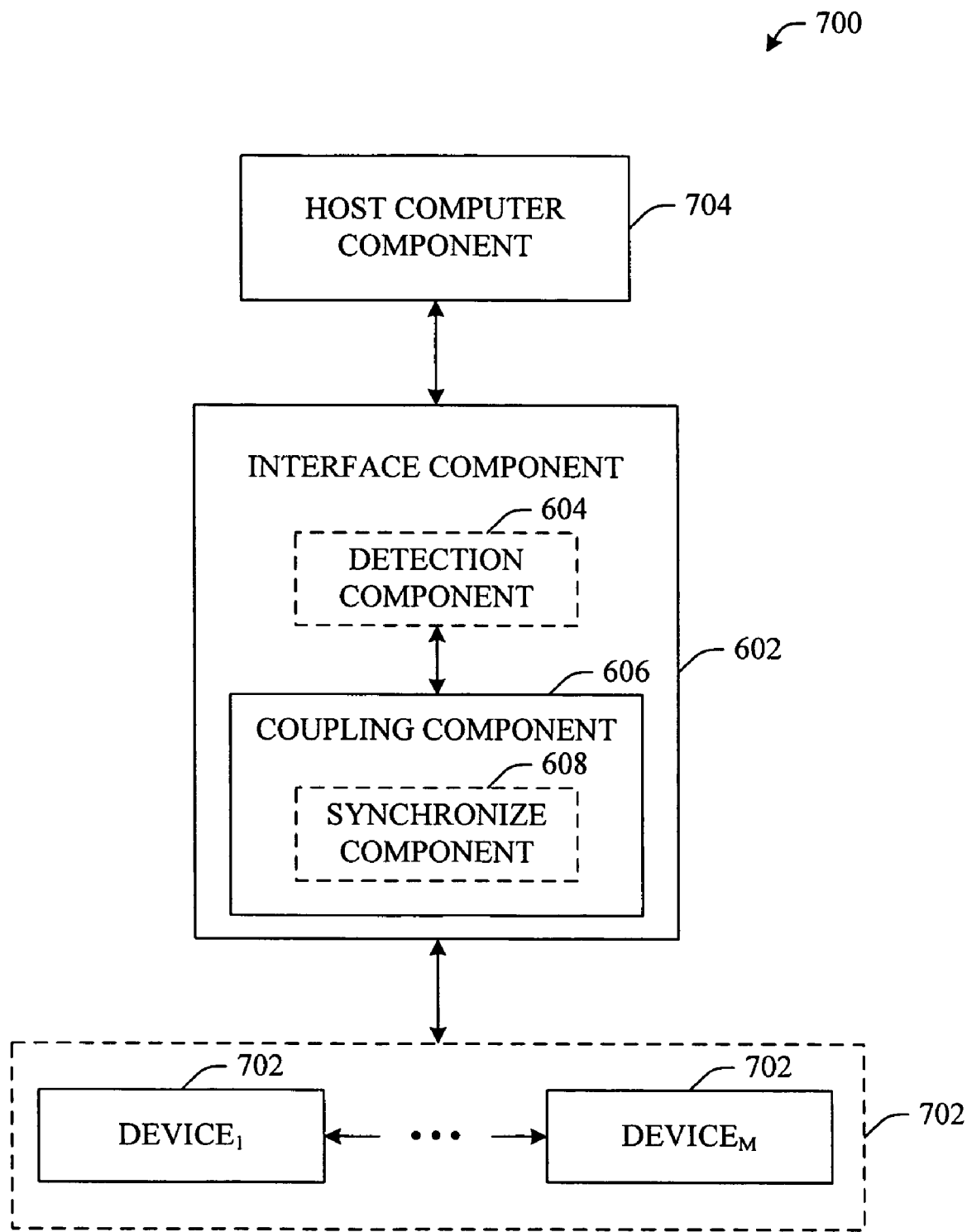
FIG. 7 illustrates a block diagram of a system that can couple a host computer to multiple devices in accordance with an aspect of the invention.

FIG. 7 illustrates another system 700 that facilitates automatic collaboration and/or synchronization of a service and/or data in accordance with an aspect of the invention. As illustrated, system 700 can include an interface component 602 having a detection component 604 and a coupling component 606. The coupling component can further include a synchronize component 608.

Interface component 602 can effect communication and/or sharing between a device component 702 and a host computer system 704. As shown, device component 702 can include 1 to M disparate device components, where M is an integer. It is to be appreciated that 1 to M device components can be referred to individually or collectively as device components 702. In operation, system 700 can facilitate automatic synchronization of data to the multiple device components 702.

Figure 8:
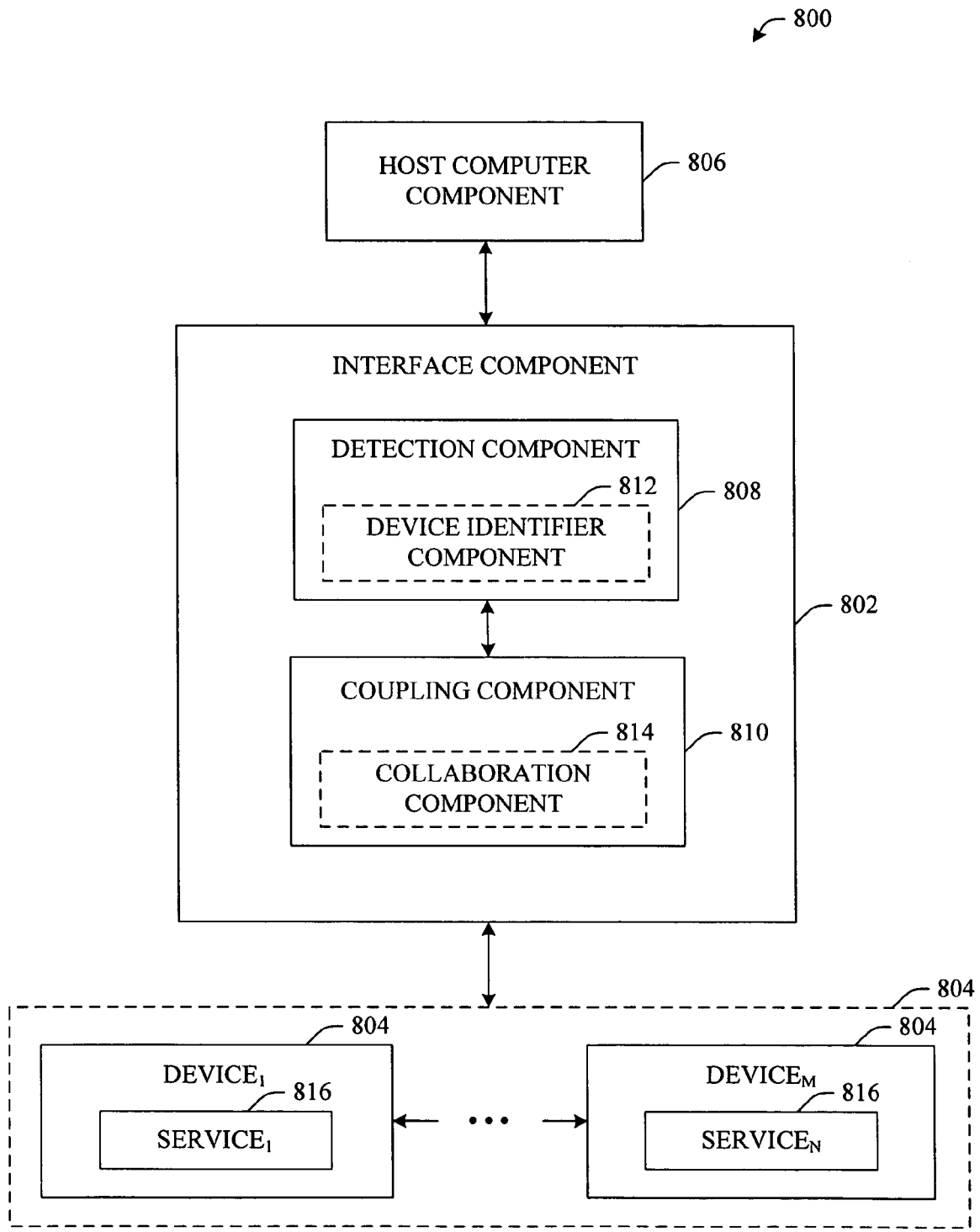
FIG. 8 illustrates a system that can collaborate multiple services from multiple disparate devices in accordance with an aspect of the invention.

Referring now to FIG. 8, a system 800 that facilitates collaboration of multiple services is illustrated. Generally, system 800 includes an interface component 802 that facilitates interfacing a device component 804 and a host computer component 806. The interface component 802 can include a detection component 808 and a coupling component 810.

As described above with reference to FIG. 1, the detection component 808 can facilitate sensing when/if the device component 804 and the host computer 806 are able to wirelessly communicate. In one example, the detection component 804 can sense when/if the device 804 or group of devices enters a wireless communication range of the host computer component 806.

Additionally, the detection component 808 can include a device identifier component 812. The device identifier component 812 can be employed to recognize a device type of device component(s) 804. In one aspect, the device identifier component 812 can be employed to identify that the device 804 is a cellular telephone. This identification can be communicated to the coupling component 810 whereby appropriate configurations and settings can be effected to prompt coupling and service collaboration. As shown, a collaboration component 814 can be employed to effect collaboration of one or more service components.

More particularly, device component 804 can include 1 to M device components, where M is an integer. It will be appreciated that the 1 to M device components can be referred to individually or collectively as device components 804. As illustrated, each device component can have one or more associated service components 816. In other words, device components 804 can include 1 to N service components, where N is an integer. It is to be understood that the 1 to N service components can be referred to collectively or individually as service components 816.

In operation, the detection component 808 can detect when one or more device components 804 enter a wireless range of the host computer component 806. The device identifier component 812 can facilitate configuration of the coupling component 810 to an appropriate device type. In accordance therewith, the collaboration component 814 can effect communicating with the device component(s) 804 whereby one or more service components 816 can be collaborated, aggregated and/or synchronized. As a result, a service 816 initially associated and dedicated to a device 804 can be accessed and utilized via host computer component 806.

As well, as described above, it will be appreciated that the detection component 808 can identify when/if a device component 804 is leaving the communication range of the host computer component 806. In response thereto, a collaborated service 816 can be transferred back to the appropriate device 804 prior to decoupling from the host computer 806. It will be appreciated that decoupling can occur upon leaving the communication range of the host computer component 806.

Figure 9:
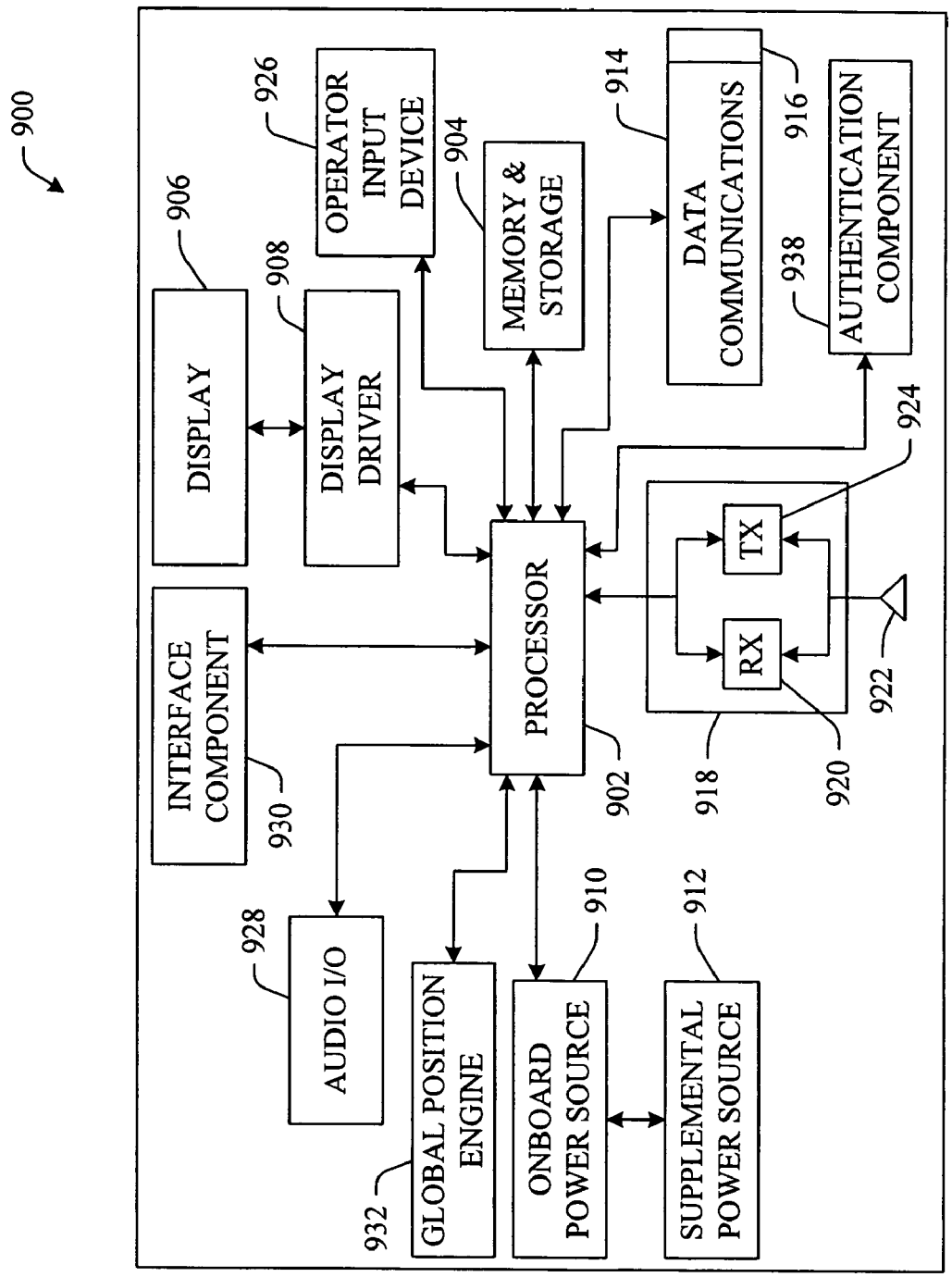
FIG. 9 is a schematic block diagram of a portable handheld device according to one aspect of the subject invention.

Referring now to FIG. 9, there is illustrated a schematic block diagram of a portable hand-held device 900 according to one aspect of the subject invention, in which a processor 902 is responsible for controlling the general operation of the device 900. The processor 902 can be programmed to control and operate the various components within the device 900 in order to carry out the various functions described herein. The processor 902 can be any of a plurality of suitable processors. The manner in which the processor 902 can be programmed to carry out the functions relating to the subject invention will be readily apparent to those having ordinary skill in the art based on the description provided herein. As will be described in greater detail infra, an AI reasoning component and/or a rules-based logic component can be used to effect an automatic action of processor 902.

A memory and storage component 904 connected to the processor 902 serves to store program code executed by the processor 902, and also serves as a storage means for storing information such as data, services, metadata, device states or the like. The memory 904 can be a non-volatile memory suitably adapted to store at least a complete set of the information that is acquired. Thus, the memory 904 can include a RAM or flash memory for high-speed access by the processor 902 and/or a mass storage memory, e.g., a micro drive capable of storing gigabytes of data that comprises text, images, audio, and video content. According to one aspect, the memory 904 has sufficient storage capacity to store multiple sets of information relating to disparate services, and the processor 902 could include a program for alternating or cycling between various sets of information corresponding to disparate services.

A display 906 can be coupled to the processor 902 via a display driver system 908. The display 906 can be a color liquid crystal display (LCD), plasma display, touch screen display or the like. In one example, the display 906 is a touch screen display. The display 906 functions to present data, graphics, or other information content. Additionally, the display 906 can display a variety of functions that control the execution of the device 900. For example, in a touch screen example, the display 906 can display touch selection buttons.

Power can be provided to the processor 902 and other components forming the hand-held device 900 by an onboard power system 910 (e.g., a battery pack). In the event that the power system 910 fails or becomes disconnected from the device 900, a supplemental power source 912 can be employed to provide power to the processor 902 (and other components (e.g., sensors, image capture device)) and to charge the onboard power system 910. The processor 902 of the device 900 can induce a sleep mode to reduce the current draw upon detection of an anticipated power failure.

The device 900 includes a communication subsystem 914 having a data communication port 916, which is employed to interface the processor 902 with a remote computer, server, service, or the like. The port 916 can include at least one of Universal Serial Bus (USB) and IEEE 1394 serial communications capabilities. Other technologies can also be included, but are not limited to, for example, infrared communication utilizing an infrared data port, Bluetooth™, etc.

The device 900 can also include a radio frequency (RF) transceiver section 918 in operative communication with the processor 902. The RF section 918 includes an RF receiver 920, which receives RF signals from a remote device via an antenna 922 and can demodulate the signal to obtain digital information modulated therein. The RF section 918 also includes an RF transmitter 924 for transmitting information (e.g., data, service) to a remote device, for example, in response to manual user input via a user input 926 (e.g., a keypad) or automatically in response to a detection of entering and/or anticipation of leaving a communication range or other predetermined and programmed criteria.

The transceiver section 918 facilitates communication with a transponder system, for example, either passive or active, that is in use with other portable devices and/or host computer system. In one aspect, the processor 902 signals (or pulses) the remote transponder system via the transceiver 918, and detects the return signal in order to read the contents of the detected information. In one implementation, the RF section 918 further facilitates collaboration of a service and/or data via the device 900. In furtherance thereof, an audio I/O section 928 is provided as controlled by the processor 902 to process voice input from a microphone (or similar audio input device) and can transmit audio output signals (from a speaker or similar audio output device). It is to be appreciated that multi-lingual functionality can be employed to convert and/or translate voice (and text) input/output to effect comprehendible communication.

In another implementation, the device 900 can provide speech recognition capabilities such that when the device 900 is used as a voice activated device, the processor 902 can facilitate high-speed conversion of the voice signals into text or operative commands. For example, the converted voice signals can be used to control the device 900 in lieu of using manual entry via the keypad 926. As well, in another aspect, voice commands can be employed to effect coupling and/or decoupling from a remote system. As well, collaboration, aggregation, synchronization and transfer of services and/or data can be prompted via voice commands. These functionalities can be effected through the utilization of interface component 930 as described supra.

Other devices such as a global positioning engine 932 can be provided within the housing of the device 900 to effect functionality described supra. For example, the global position engine 932 can be employed in connection with detecting location and prompting collaboration, aggregation and/or synchronization of services and/or data corresponding to a state of the device 900.

Figure 10:
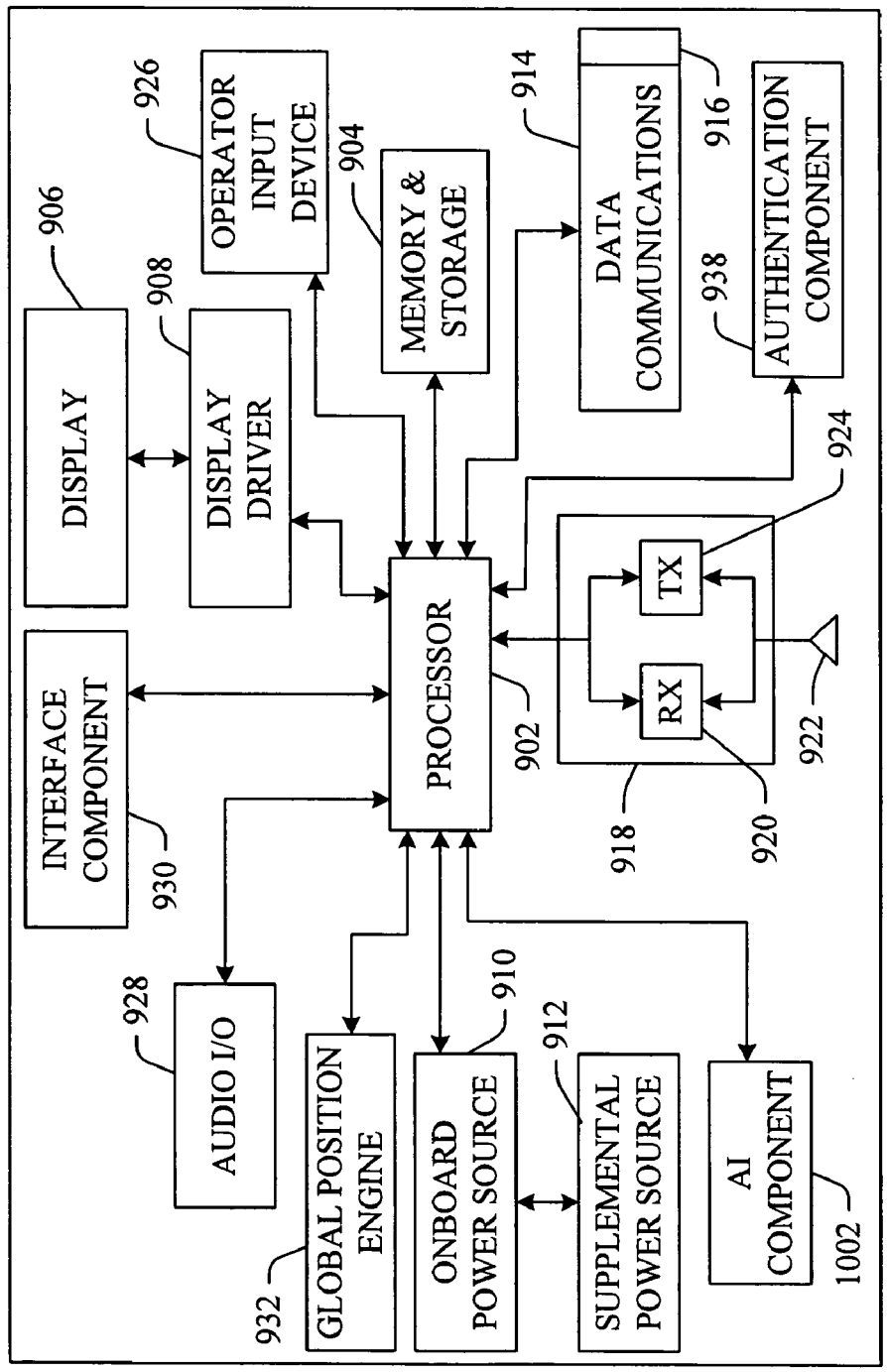
FIG. 10 illustrates an architecture of a portable handheld device including an artificial intelligence-based component that can automate functionality in accordance with an aspect of the invention.

FIG. 10 illustrates a system 1000 that employs artificial intelligence (AI) component 1002 which facilitates automating one or more features in accordance with the subject invention. The subject invention (e.g., with respect to monitoring, communicating, collaborating, aggregating, synchronizing, . . . ) can employ various AI-based schemes for carrying out various aspects thereof. For example, a process for determining when/if to initiate coupling or decoupling of a device or for initiating collaboration of a service (or data) can be facilitated via an automatic classifier system and process.

A classifier is a function that maps an input attribute vector, x=(x1, x2, x3, x4, xn), to a class label class(x). A classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits in an optimal way the triggering input events from the non-triggering events. Intuitively, this makes the classification correct for testing data that is identically distributed to training data. [0]Other classification approaches, including Naïve Bayes, Bayesian networks, decision trees, neural networks, fuzzy logic models, maximum entropy models, etc., can be employed. Classification as used herein also is inclusive of statistical regression that is utilized to develop models of priority.

As will be readily appreciated from the subject specification, the subject invention can employ classifiers that are pre-trained (e.g., via a generic training data from multiple users) as well as methods of reinforcement learning (e.g., via observing user behavior, observing trends, receiving extrinsic information). Thus, the subject invention can be used to automatically learn and perform a number of functions, including but not limited to determining, according to a predetermined criteria, a present and/or target location, location-based data and/or services, when/if to communicate data location-based services, which language and/or translation to employ, etc.

Figure 11:
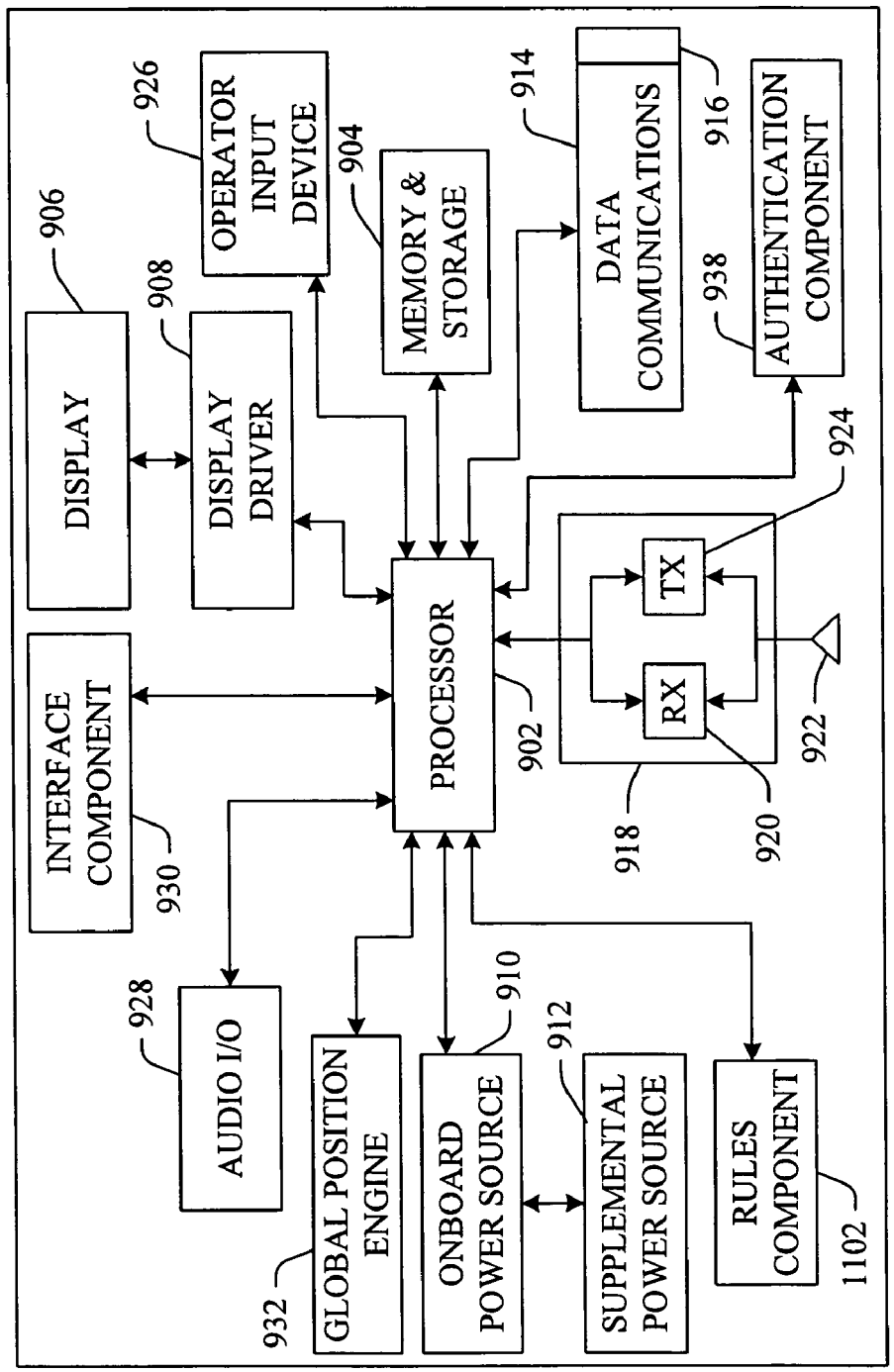
FIG. 11 illustrates an architecture of a portable handheld device including a rules-based logic component that can automate functionality in accordance with an aspect of the invention.

With reference now to FIG. 11, an alternate aspect of the invention is shown. More particularly, handheld device 1100 generally includes a rules-based logic component 1102. In accordance with this alternate aspect, an implementation scheme (e.g., rule) can be applied to define when/if to initiate coupling/decoupling, prompt collaboration, aggregation and/or synchronization, etc. By way of example, it will be appreciated that the rule-based implementation of FIG. 11 can automatically define criteria whereby the processor 902 can employ the criteria to determine which service should be collaborated based upon a specific device, service or data type or combination thereof. In response thereto, the rule-based implementation can initiate communication and/or collaboration of services and/or data by employing a predefined and/or programmed rule(s). These predefined and/or preprogrammed rules can be based at least in part upon a state of the device.

By way of further example, a user can establish a rule that can prompt a particular service collaboration. Accordingly, a rules-based decision logic can be employed to effect an action based upon the device type as well as the disparate connected system. It will be appreciated that any of the specifications and/or functionality utilized in accordance with the subject invention can be programmed into a rule-based implementation scheme. It is also to be appreciated that this rules-based logic can be employed in addition to, or in place of, the AI reasoning components described with reference to FIG. 10.

Figure 12:
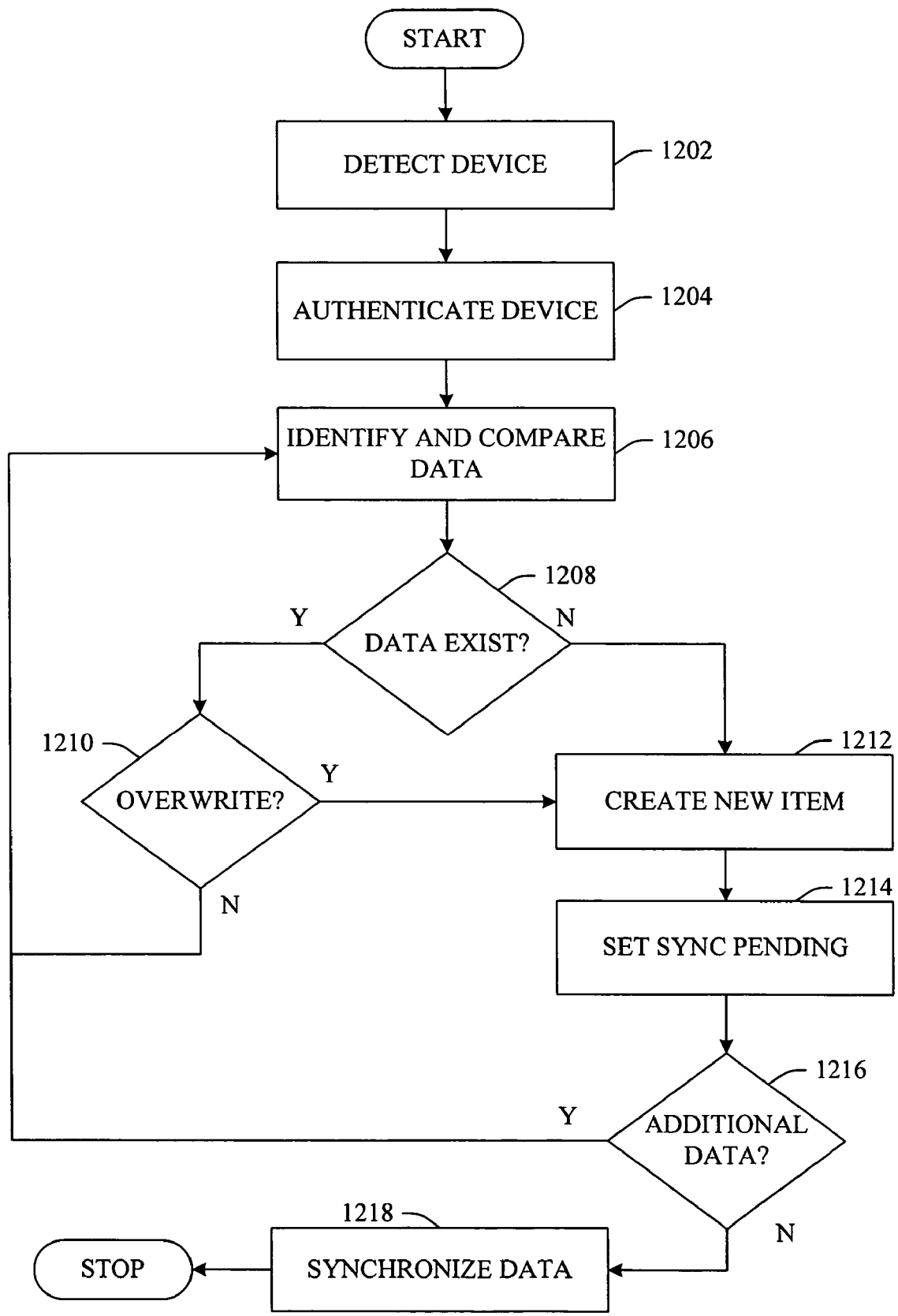
FIG. 12 illustrates an exemplary flow chart of procedures that facilitate automatic synchronization of data in accordance with an aspect of the invention.

FIG. 12 is a flow chart of procedures that can effect automatic synchronization of data. At 1202 a portable device is detected. As described supra, any suitable means can be employed to detect communication of the portable device. Optionally, the detected device can be authenticated at 1204.

At 1206, data can be identified and compared between the portable device and the connected system. It is to be appreciated that AI reasoning and/or rules-based logic can be employed to identify data (and/or services). In accordance with comparing data at 1206, at 1208, a determination is made if the data exists on both systems. If the data does exist, the prompt can be communicated to determine if the data should be overwritten at 1210. If the data should not be overwritten, the methodology returns to 1206 and continues to compare data.

If at 1208 a determination is made that the data does not exist or if at 1210 a determination is made to overwrite existing data, the methodology can create a new item (e.g., data, service) at 1212. Synchronization pending can be set at 1214. At 1216, a determination is made if additional data is to be synchronized, collaborated, aggregated, etc. If additional data is desired, the methodology returns to 1206 and compares data. On the other hand, if additional data is not present or desired at 1216, the data can be synchronized at 1218.

Figure 13:
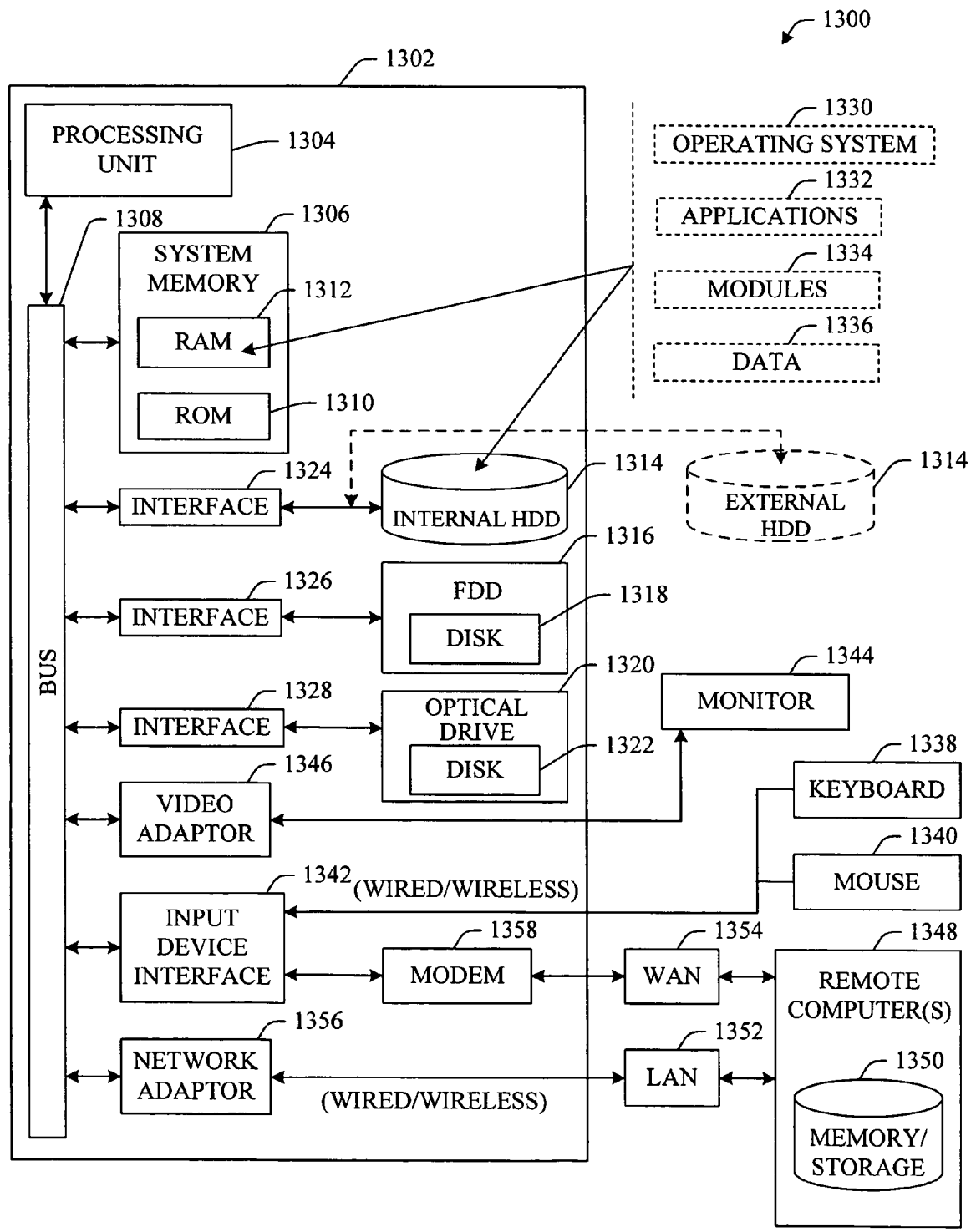
FIG. 13 illustrates a block diagram of a computer operable to execute the disclosed architecture.

Referring now to FIG. 13, there is illustrated a block diagram of a computer operable to execute the disclosed architecture of collaborating services between portable devices and a host computer. In order to provide additional context for various aspects of the subject invention, FIG. 13 and the following discussion are intended to provide a brief, general description of a suitable computing environment 1300 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the invention includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the invention can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cellular telephone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
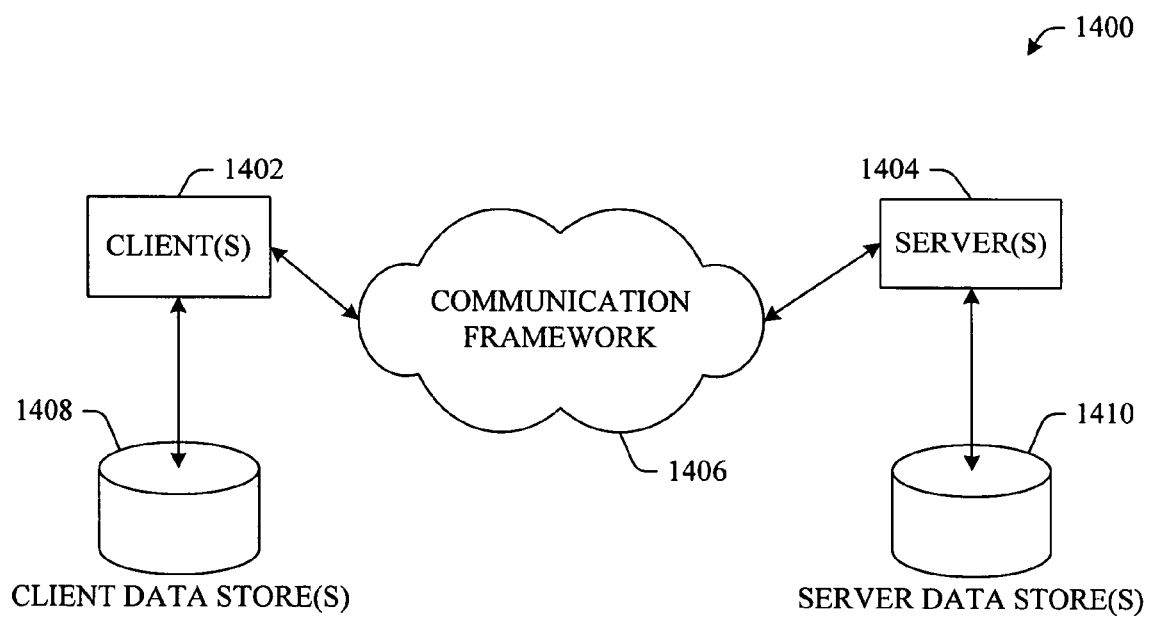
FIG. 14 illustrates a schematic block diagram of an exemplary computing environment in accordance with the subject invention.

Referring now to FIG. 14, there is illustrated a schematic block diagram of an exemplary computing environment 1400 in accordance with the subject invention. As illustrated in FIG. 14, it is to be understood that the "client(s)" can be representative of a portable device and the "server(s)" can be representative of a host computer or other disparate portable device. As shown, the system 1400 includes one or more client(s) 1402. The client(s) 1402 can be hardware and/or software (e.g., threads, processes, computing devices). The client(s) 1402 can house cookie(s) and/or associated contextual information by employing the invention, for example.

The system 1400 also includes one or more server(s) 1404. The server(s) 1404 can also be hardware and/or software (e.g., threads, processes, computing devices). The servers 1404 can house threads to perform transformations by employing the invention, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates device interactions between a first device and a second device, comprising:
   a detection component that senses entry of a first device into a wireless communication range of a second device, anticipated exit of the first device from the wireless communication range of the second device, and actual exit of the first device from the wireless communication range of the second device;
   a coupling component that establishes a private network connection between the first device and the second device upon the sensed entry of the first device into the wireless communication range of the second device and terminates the private network connection between the first device and the second device upon the sensed actual exit of the first device from the wireless communication range of the second device, the private network enables a service performed by the first device at least one of prior to establishment of the private network connection or after termination of the private network connection to be automatically effectuated at least in part by the second device while the first device and the second device are coupled; and a synchronize component that updates one or more data files related to the service retained by the first device to match a version of the one or more data files retained by the second device upon the sensed anticipated exit of the first device from the wireless communication range of the second device to transition effectuation of the service to the first device.

2. The system of claim 1, wherein the first device is a cellular telephone, the second device is a personal computer and the service is one of a voice communication, video communication, textual communication and binary communication.

3. The system of claim 1, wherein the coupling component automatically facilitates synchronization of data between the first device and the second device based at least in part upon a state of the first device.

4. The system of claim 1, wherein the coupling component facilitates control of the second device via the first device.

5. The system of claim 1, further comprising an authentication component that verifies a permission associated with the first device prior to collaboration of the service.

6. The system of claim 1, further comprising a security component that performs encryption prior to collaboration of the service.

7. The system of claim 1, wherein the service is at least one of an access of a text file, image file, digitally encoded voice file, and digitally encoded video file.

8. The system of claim 7, wherein the coupling component automatically synchronizes the service between the first device and the second device.

9. The system of claim 1, further comprising a third device, wherein the coupling component automatically collaborates an additional service between the first device, the second device and the third device.

10. The system of claim 1, wherein the detection component further comprises a device identifier component that determines a device type of the first device and communicates the device type to the coupling component, and the coupling component facilitates collaboration of the service based at least in part upon the device type.

11. A computer-readable medium having stored thereon computer-executable instructions for carrying out the system of claim 1.

12. The system of claim 1, wherein the detection component detects one or more of the actual exit or the anticipated exit of the first device from the wireless communication range of the second device based on at least one of a Global Positioning System (GPS) or an accelerometer.

13. The system of claim 2, wherein the service is voice communication and the coupling component facilitates transfer of the voice communication from the first device to the second device upon entry of the first device into the wireless communication range of the second device.

14. The system of claim 1, wherein the coupling component facilitates migration of a service from the first device to the second device upon entry of the first device into the wireless communication range of the second device and the synchronize component facilitates transfer of the service from the second device to the first device upon exit of the first device from the wireless communication range of the second device.

* * * * *